United States Patent [19]

Wolff et al.

[11] Patent Number: 4,524,169
[45] Date of Patent: Jun. 18, 1985

[54] ELASTIC MOLDING MATERIAL, METHOD OF PRODUCING AND SHAPING AND USE THEREOF

[75] Inventors: Siegfried Wolff, Bornheim-Merten; Paul Golombeck, Bornheim, both of Fed. Rep. of Germany

[73] Assignee: Degussa Aktiengesellschaft, Frankfurt, Fed. Rep. of Germany

[21] Appl. No.: 579,914

[22] Filed: Feb. 13, 1984

[30] Foreign Application Priority Data

Feb. 17, 1983 [DE] Fed. Rep. of Germany ....... 3305373

[51] Int. Cl.$^3$ ................................................ C08K 5/54
[52] U.S. Cl. ...................................... 524/263; 524/265
[58] Field of Search .............................. 524/265, 263

[56] References Cited

U.S. PATENT DOCUMENTS

| 3,073,789 | 1/1963 | Goldstein et al. | 524/265 |
| 3,484,333 | 12/1969 | Vanderbilt | 524/265 |
| 3,873,489 | 3/1975 | Thurn et al. | 524/393 |
| 4,076,550 | 2/1978 | Thurn et al. | 106/288 Q |
| 4,229,333 | 10/1980 | Wolff et al. | 524/262 |
| 4,244,860 | 1/1981 | Kühnel et al. | 524/263 |
| 4,292,224 | 9/1981 | Theodore | 524/263 |
| 4,297,145 | 10/1981 | Wolff et al. | 524/263 |

FOREIGN PATENT DOCUMENTS

| 0073064 | 3/1983 | European Pat. Off. | 524/265 |
| 2933247 | 3/1980 | Fed. Rep. of Germany | 524/265 |
| 1518560 | 7/1978 | United Kingdom . | |
| 1522830 | 8/1978 | United Kingdom . | |
| 1588060 | 4/1981 | United Kingdom . | |

Primary Examiner—Paul R. Michl
Assistant Examiner—N. Sarofim
Attorney, Agent, or Firm—Beveridge, DeGrandi & Weilacher

[57] ABSTRACT

Elastic molding materials based on thermoplastic rubber containing at least one silicate filler and an organo-silicon compound having at least one alkoxy group are described together with a method of producing and shaping it and its application and use thereof in molded articles such as shoe soles.

9 Claims, No Drawings

ELASTIC MOLDING MATERIAL, METHOD OF PRODUCING AND SHAPING AND USE THEREOF

| TYPICAL EXAMPLES OF THE THERMOPLASTIC SYNTHETIC MATERIALS UTILIZED IN ACCORDANCE WITH THE INVENTION ARE, FOR EXAMPLE, | |
|---|---|
| CARIFLEX ® TR 4113 | THERMOPLASTIC RUBBER DEUTSCHE SHELL CHEMIE GMBH POSTFACH D-6000 FRANKFURT/M. 1 |
| EUROPRENE ® SOL T | STYRENE-BUTADIENE THERMOPLASTIC RUBBER WITH A RADIAL STRUCTURE ENICHEM POLIMERI SpA ASSAGO MILANO/ITALY |
| FINAPRENE ® 475 | SOLUTION POLYMERIZED BUTADIENE-STYRENE THERMOPLASTIC ELASTOMER DEUTSCHE FINA GMBH BLEICHSTRASSE 2-4 D-6000 FRANKFURT/M |
| VESTOPREN ® TP 2047 | ETHYLEN-PROPYLEN THERMOPLASTIC RUBBER CHEMISCHE WERKE HULS AG D-4370 MARL 1 |
| TYPICAL EXAMPLES OF THE SYNTHETIC RESINS UTILIZED IN ACCORDANCE WITH THE INVENTION ARE, FOR EXAMPLE, | |
| POLYSTYRENE 144 C | BADISCHE ANILIN- & SODA-FABRIK AG D-6700 LUDWIGSHAFEN |
| LEVAPREN ® 450 | ETHYLENE-VINYLACETATE-CoPOLYMER BAYER AG D-5090 LEVERKUSEN 1 |
| LUPOLEN ® H 1800 | POLYETHYLENE BADISCHE ANILIN- & SODA-FABRIK AG D-6700 LUDWIGSHAFEN |
| CARLONA ® KM 61 | POLYPROPYLENE DEUTSCHE SHELL CHEMIE GMBH POSTFACH D-6000 FRANKFURT/M. 1 |

The invention relates to elastic molding materials based on thermoplastic rubber containing as a filler at least one silicate filler.

Within the scope of the present invention, the term "thermoplastic rubber" means a thermoplastic polymer having an elastic or elastomeric behavior similar to that of conventional natural rubber and produced according to methods known in the prior art from the styrene and butadiene monomers or styrene and isoprene monomers or ethylene and propylene monomers. The thermoplastic elastomer rubbers are block copolymers; e.g., 3-block copolymers consisting of two phases. These copolymerized elastomers need not be vulcanized. To ensure their desired good elastic behavior, the total polystyrene content of these copolymers is kept below about 40%.

The thermoplastic rubbers (shortened TR) described hereinabove are also called "teleblock" rubbers.

The use of highly dispersed silica fillers in thermoplastic rubber such as, e.g., the finely divided fillers composed essentially of silica and prepared from aqueous solutions of water glass by precipitation with an acid is also a well-known technique. The addition of silica enhances the external appearance of, for example, shoe soles made from thermoplastic synthetic material in which the soles acquire a desired stylish delustrant effect. Furthermore, the addition of silica increases the friction during the preparation of the mixtures, which results in a better and more rapid dispersion of all of the components of the mixture. It also promotes or accelerates the adsorption of the advantageously used processing oil by the thermoplastic rubber, which leads to an improvement in the rubber and a shortening of the mixing times. Also, the adhesive capacity of shoe soles, for example, is improved and the rupture strength is increased. Other advantages of the concurrent use of silica fillers are, for example, the increase of the tensile strength, of the tensile modulus, and of the Shore hardness of the molded articles produced.

However, these advantages are offset by two drawbacks: first, the concurrent use of silica as a filler leads to an increase in the viscosity which is dependent upon the degree of filling and which can cause breakdowns as a result of the overload of processing machines and, second, it leads to a higher adsorption of moisture by the manufactured products because the precipitated silica fillers are hygroscopic and can take up moisture, depending on the atmospheric humidity.

After incorporation of this filler into the thermoplastic rubber, the rubber mixture takes up moisture or water, if this is not actively prevented. Manufactured articles for daily use made from a mixture based on thermoplastic rubber and containing a silicate filler can take up considerable quantities of moisture, depending on the environmental conditions, and thereby resulting in a significant reduction of their functional value.

It has been found that the disadvantages described hereinabove, such as increase in viscosity and moisture adsorption, can be moderated and, due to the improvement of the physical properties, considerably larger quantities of fillers may be used in thermoplastic rubber.

The subject matter of the invention is an elastic molding material containing or composed of a thermoplastic rubber or a mixture of such rubbers, optionally mixed with a thermoplastic synthetic material and/or a synthetic resin, further containing at least one silicate filler in an amount of 1 to 300, preferably 5 to 150, parts by weight, a processing or plasticizing oil in an amount of 0 to 100 parts by weight, and at least one stabilizer from the group of agents which impart resistance to fatigue, oxidation, ozone and light in conventional amounts, i.e. sufficient to achieve the intended result, and which molding material further contains at least one organosilicon compound, having at least one alkoxysilyl group, in an amount of 0.1 to 25, preferably 0.1 to 15, parts by weight, all of the said parts by weight being referred to 100 parts by weight of thermoplastic rubber, or in that the molding material contains said organosilicon compound or compounds in a blend with the silicate filler, or in that the molding material contains a finely divided organosilicon compound or compounds chemically united with the silicate filler.

A further object of the invention is an elastic molding material which contains as the organosilicon compounds at least one organosilane with the formulae:

$$X_p—C_mH_{2m+1-p}—SiR_n^1(OR)_{3-n},\qquad I$$

wherein X represents chlorine or bromine, p is 1 or 2; m is 1 to 5, $R^1$ is $C_1$- to $C_5$-alkyl, $C_5$- to $C_6$-cycloalkyl or phenyl, R is $C_1$- to $C_5$-alkyl, $C_5$- to $C_6$-cycloalkyl, methoxyethyl, ethoxyethyl, phenyl or benzyl and n=0; 1 or 2, including a hydrolyzate and/or a condensate thereof, $$[R_n^1(RO)_{3-n}Si—(Alk)_q(Ar)_r—]_2S_x \text{ or} \qquad II$$

$$R_n^1(RO)_{3-n}Si—Alk—SH, \qquad III$$

wherein Ar represents aryl with 6 to 12 C-atoms, r=0 or 1, $R^1$ is $C_1$- to $C_5$-alkyl, phenyl, R is $C_1$- to $C_5$-alkyl, methoxyethyl, ethoxyethyl, phenyl or benzyl, n=0, 1 or 2, Alk represents a bivalent, straight or branched carbohydrate residue with 1 to 6 carbon atoms, and x is an integer from 2.0 to 8.0, including their hydrolyzates and/or condensates, q is 0 or 1, and which molding material contains as silicate fillers at least one filler obtained by precipitation from an aqueous medium and essentially composed of silica with a specific surface area measured, in compliance with DIN 66132, between 30 and 250 m²/g, or in that the molding material contains a mixture or a chemical reaction product consisting of at least one of said organosilanes and at least one of said silica fillers or carbon black instead of the individual constituents of the mixture of the reaction product, or instead of some of said individual constituents.

The haloalkylalkoxy- and phenoxysilanes of Formula I include in particular the following: chloromethyltrimethoxysilane, chloromethyltriethoxysilane, bromomethyltriethoxysilane, dichloromethyltriethoxysilane, 1-chloro-1-methyl-methyl-trimethoxysilane, 2-chloro-ethyltrimethoxysilane, 2-bromoethyltrimethoxysilane, 2-dibromoethyltrimethoxysilane, 3-bromopropyltrimethoxysilane, 3-chloropropyltrimethoxysilane, 3-dichloropropyltrimethoxysilane, 3-chloropropyltriethoxysilane, 3-bromopropyltriethoxysilane, 3-dibromopropyltriethoxysilane, 2-bromo-1-methylethyltripropoxysilane, 2-dichloroethyltri-n-butoxysilane, 2-chloroethyl-tri-2'-methyl-propoxysilane, 3-bromopropyl-tri-t-butoxysilane, 3-dibromopropyltriisopropoxysilane, 3-bromopropyltri-n-pentoxysilane, 2-chloroethyl-tri-2'-ethyl-ethoxysilane, 2-bromo-2-methylethyldimethoxyethoxysilane, 3-dichloropropylmethoxyethoxypropoxysilane, 3-chloropropyldimethoxy-methylsilane, 3-bromopropyldiethoxyethylsilane, 3-chloropropyldiethoxydiethlsilane, 3-bromopropyl-tris-(1'-methoxyethoxy)-silane, 3-chloropropyldiethoxyphenylsilane, 3-dichloropropyldimethoxycyclopentylsilane, 3-bromopropyl-di-n-propoxy-cyclohexylsilane, 3-chloropropyldicyclohexoxycyclohexylsilane, 3-chloropropylethoxyphenyloxyethylsilane, 3-dibromopropylbenzyloxyethoxyethylsilane, 4-chloro-n-butyl-trimethoxysilane, 4-bromobutyltrimehoxysilane, 3-chloro-2-methyl-propyltrimethoxysilane, 3-chloro-2-ethyl-propyldiethoxymethylsilane, 3-bromo-3-ethyl-propyldimethoxymethylsilane, 3-chloro-2-methyl-propyl-dimethoxyphenylsilane, 5-chloro-n-pentyltriethoxysilane, 4-bromo-2-methyl-butyltriethoxysilane, 2-chloro-2-methyl-ethyl-tripentoxysilane, 2-dichloro-2-methylethyltributyloxysilane, 3-bromopropyltriphenoxysilane, 3-chloropropyltribenzyl-oxysilane, 3-dibromopropyltricyclopentoxysilane and 3-bromopropyltri-n-pentoxysilane. The haloalkyloxysilanes with a halogen atom (p=1 in Formula I) and with three alkoxysilyl groups are preferred.

The bis-(trialkoxysilyl-alkyl)-oligosulfides are particularly counted among the oligosulfidic silanes of Formula II which are known from the prior art, e.g., from U.S. Pat. No. 3,873,489 and which can be prepared according to the processes described in German Pat. No. 25 42 534 or in West German AS 25 58 191. Of these trialkoxysilanes and their mixtures with the general Formula II the bis-(3-trimethoxy-, -(3-triethoxy- and -(3-tripropoxy-silyl-propyl)-polysulfides are preferred, i.e., the di-, tri- and tetrasulfides, particularly the triethoxy compounds with 2, 3 or 4 sulfur atoms and mixtures thereof. Preferably, these oligosulfidic silanes are used in amounts of 1 to 15 parts by weight per 100 parts by weight silicate filler in the new thermoplastic rubber mixtures. In particular, the following are also advantageously used:

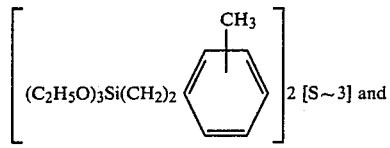

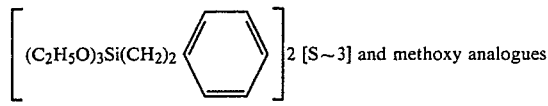

Preferably, the following meroaptosilanes of Formula III may be employed for purposes of the invention: mercaptomethyltrimethoxysilane, mercaptomethyltriethoxysilane, mercaptomethyltri-i-propoxysilane, 2-mercaptoethyltrimethoxysilane, 2-mercaptoethyltriethoxysilane, 2-mercaptoethyltri-i-propoxysilane, 2-mercaptoethyltributoxysilane, 2-mercaptoethyltri-n-propoxysilane, 2-mercaptoethyldiethoxymethylsilane, 2-mercapto-2-methylethyl-triethoxysilane, 2-mercapto-1-methylethyltrimethoxysilane, 3-mercaptopropyltrimethoxysilane, 3-mercaptopropyltriethoxysilane, 3-mercaptopropyltri-i-propoxysilane, 3-mercaptopropyltri-n-propoxysilane, 3-mercaptopropyltributoxysilane, 3-mercaptopropyltris-(methoxyethoxy)-silane, 4-mercaptobutyltriethoxysilane, 5-mercaptopentyltrimethoxysilane, 5-mercaptopentyltri-i-propoxysilane, 3-mercaptopropyldiethoxyethylsilane, 3-mercaptopropyldipropoxypropylsilane, 6-mercaptohexyltriethoxysilane.

Some of the organosilicon compounds listed hereinabove, more particularly those of Formulas I, II and III, may also be substituted by their hydrolyzates and condensates, i.e., mixtures of the non-hydrolyzed or non-condensed silanes and the hydrolyzed and/or condensed silanes. This hydrolysis or condensation need not be complete, so that partial hydrolyzates or partial condensates may also be employed according to the invention. These partial hydrolyzates or partial condensates, as the case may be, can be produced whenever the silanes possess several oxysilyl groups in the molecular.

The condensates include more particularly the condensates of the silanes with alcohols, preferably dihydric alcohols such as, e.g., ethylene glycol, propylene glycol, trimethylene glycol, trimethylethylene glycol, tetramethylene glycol, pentamethylene glycol, etc., diethylene glycol, butanediole such as 1,4-butandiol, dipropylone glycol, polyethylene glycols and glycide (2,3-epoxypropanol-1).

The hydrolysis as well as the condensation reactions are carried out according to methods known from the prior art. They lead to higher molecular compounds with e.g., higher boiling points, etc., which can be advantageous for the production of the molding materials taught by the invention.

Furthermore, organosilanes with the formula:

$$A-SiR_n^1(OR)_{3-m} \qquad \text{IV}$$

can also be used individually or in a mixture, in which n, $R^1$ and R represent the groups mentioned hereinabove and A is azido, thiocyanato, amino or epoxyalkyl with a straight or branched $C_1$-$C_6$-hydrocarbon residue such as alkyl, or a vinyl group or an aralkyl residue.

Particularly suitable are thiocyanatoalkylalkoxysilanes such as 3-thiocyanatopropyltrimethoxy-, triethoxy-, -tri-n-propoxy-, -tri-isopropoxysilane and the corresponding 2-thiocyanatoethylalkoxysilanes, as well as vinylalkoxysilanes, such as vinyltrimethoxysilane, vinyltriethoxysilane, vinyltripropoxy-silane, vinyl-tris-i-propoxysilane, vinyl-tri-(2-methoxyethoxy)-silane, divinyldiethoxysilane, divinyldimethoxysilane, divinyl-di-i-propoxysilane, divinyl-di-n-propoxysilane, vinyl-methyl-di-methoxysilane, vinylethyldiethoxysilane, vinylmethyl-di-(2-ethoxy-ethoxy)-silane, vinyldiethylethoxysilane, vinyldi-methylmethoxysilane, vinyldiethyl-2-methoxyethoxysilane, vinylphenyldiethoxysilane, vinyldiphenylmethoxysilane, with monovinylsilanes being preferred.

Among azidosilanes the following are preferred: azidomethyltriethoxysilane, 2-azidoethyltriethoxysilane, 3-azidopropyltriethoxysilane and the corresponding methoxy analogues.

Silanized polybutadienes are also very suitable, including polybutadienes with varying molecular weights and vinyl group concentrations whose double bonds have been saturated at least in part by conversion with reactive organosilanes.

Included among the thermoplastic types of rubber used in accordance with the teachings of the invention are in particular block copolymers having the structure of polystyrene-polybutadiene, polyisoprene-polystyrene, particularly 3-block copolymers, but also copolymers based on ethylene-propylene.

The fillers that must obligatorily be used concurrently according to the invention, including mixtures of two or more fillers, are fillers that are known in the art of rubber technology. The term "silicate filler" is to be interpreted broadly and refers to fillers that consist of silicates, that contain silicates and/or silicates that are chemically bonded in the broadest sense possible.

The claimed group of silicate fillers that are an essential element of the invention have on the particle surfaces silanol groups capable of reacting chemically with the alkoxysilyl groups and oxygroups such as, e.g. the phenoxy-group of the organosilicon compounds, resulting in the formation of —Si—O—Si— binding links. The silicate fillers include:

Highly dispersed silica fillers essentially composed of silicon dioxide with specific surfaces ranging from approximately 5 to 100, preferably 20 to 400 m$^2$/g (measured in accordance with the nitrogen adsorption method as described in DIN German Industrial Standard 66 132) and with primary particle sizes ranging from approximately 10 to 400 nm which can be prepared, for example, by precipitation in an aqueous medium, by hydrothermal decomposition, by hydrolytic and/or oxidative high-temperature conversion, also called flame hydrolysis, of volatile silicon halides (pyrogenic silica) or by an electric arc process. These silica containing fillers may also be present as a mixed oxide or as a mixture of oxides containing the oxides of the metals aluminum, magnesium, calcium, barium, zinc and/or titanium.

Synthetic silicates, e.g., aluminum silicates or alkaline earth silicates such as magnesium or calcium silicate, with specific surfaces of approximately 20 to 400 m$^2$/g and primary particle sizes ranging from approximately 10 to 400 nm.

Natural silicates, e.g., kaolin, clays, siliceous chalks and asbestoses, as well as natural silicas, such as quartz, e.g., as finely crushed quartz sands and kieselguhr (diatomaceous earth).

Glass fibers and glass fiber products such as mats, cords, textile glass and the like, as well as micromarbles.

These silicate fillers are employed in amounts of 1 to 300, preferably 5 to 150, parts by weight referred to 100 parts by weight of the thermoplastic rubber.

Mixtures of fillers are, for example: silica fillers of various origins, silica/kaolin or silica/glass fibers/asbestos as well as blends of silicate containing reinforcing fillers with the well-known rubber blacks such as, e.g., silica/HAF black or silica/glass fiber cord/ISAF black.

Typical examples of the fillers utilized in accordance with the teachings of the invention are, for example, the silica or silicates manufactured and sold by Degussa AG under the trade names AEROSIL ®, ULTRASIL ®, SILTEG ®, DUROSIL ®, EXTRUSIL ®, CALSIL ®. The invention prefers as silicate fillers the above mentioned highly dispersed or active silica fillers, more particularly the precipitated silicas and, preferably, in amounts of 5 to 150 parts by weight based on 100 parts by weight of thermoplastic rubber.

A variation of the invention consists in causing the organosilicon compound(s) to react with the silicate filler(s) at an elevated temperature, during which presumably the silanol groups of the silicate fillers react with the oxysilyl group(s). These silanized silicate fillers can then be processed with the other constitutents of the mixture to produce the molding material.

According to a further variation of the invention, the organosilicon compounds are mixed at ambient temperature with the silicate filler(s) and the resulting premix blend is employed to make the molding materials. This premixing to form the blend can be carried out with intensively acting powder mixers such that, as for example described in West German Pat. No. 27 47 277, a non-dusting premix blend with good storability results that can be incorporated uniformly into the rubber mixture. When using this premix, it may be advantageous not to mix beforehand the required quantity of organosilicon compound(s) with all of the necessary quantity of filler, but only with a portion thereof. Advantageously, such premixes can be used in which the organosilicon compound(s) is (are) enriched, e.g., in a 50:50 weight ratio between organosilicon compound(s) and filler(s).

If desired, e.g., for coloring purposes, for example, carbon black may be present in the molding material of the invention. In general, it can be incorporated into the mixture in quantities ranging from 0.1 to 50 parts by weight, possibly in smaller quantities, per 100 parts by weight. All kinds of carbon black may be considered, particularly those used in the rubber industry, e.g., HAF blacks and, more particularly, ISAF blacks. If carbon black or blacks are used concurrently in the molding material, the quantity of silica fillers can be reduced.

The concurrently used placticizing oil of the invention is an optional constituent of the new molding material in amounts ranging from 0 to 100, preferably, from 5 to 80, parts by weight per 100 parts by weight or rubber.

Preferably, plasticizing oils, also called processing oils, of the napthenic oil type, are employed. Of particular advantage are processing oils with a setting point between 0 and −60° C., preferably between −10° and −55° C. However, processing oils of a highly aromatic nature may also be utilized.

The stabilizer that may also be used concurrently is selected from the group of agents which imart resistance to fatigue, oxidizing, ozone and light (UV) and are substances that are well known in the rubber processing industry, and they are used in conventional amounts ranging from 0.1 to 10 parts by weight per 100 parts by weight of thermoplastic rubber; i.e. in an amount sufficient to achieve their intended result.

If necessary, other additives known in the rubber processing industry may be added in conventional quantities to the molding materials, such as, e.g., pigments, dyes, wax, other fillers such as chalk, aluminum oxide and known agents for enhancing the adhesiveness between filler or inserts (e.g., steel cord) and the rubber matrix.

Within the scope of the present invention, the figure "zero" indicated as the lower quantity limit for some constituents of the molding materials signifies that this constituent is optional; that is, it may be present in or omitted from, the molding material. In practice, if this constituent (e.g., the processing oil) is present in the molding material, then the lower quantity limit is approximately 0.5 by weight, optionally even lower, again based on 100 parts by weight of rubber.

The molding materials are produced in mixers of known construction in a manner known from the prior art. Preferably, the mixture is prepared in two separate steps. In the first step, the thermoplastic rubber is mixed with the silicate filler (in one or more identical portions one after the other) and with the organosilane, e.g., in a high-speed closed mixer for 2 to 30 minutes at a rate of 20 to 120 rpm and an initial temperature of 90° to 110° C. In the second step, the resulting mass is processed on mixing rolls of a rubber mill at an initial temperature (of the rolls) of 90° to 110° C. for 1 to 10 minutes to form a uniform rolled sheet which, by means of a knife, is cut in or through three to five times and fed lengthwise into the nip of the rubber mill. Finally, if necessary after cooling, the rolled sheet is removed from the mixing roll in a thickness of 2 to 20 mm. Optionally, the rolled sheet is comminuted into granules or similar shapes and the latter are processed by means of conventional equipment into molded articles at temperatures between 60° and 300° C.

The molding materials of the invention are used for the manufacture of shoe soles, sole plates or other molded products that are molded by injecting the molding material into a metal or plastic mold or by passing it through a molding die to make, for example, profiles, tubings, ribbons or filaments.

The following examples are presented to illustrate the invention but are not limiting thereof.

Examples of Group A

In a base mixture consisting of 100 parts by weight of a thermoplastic rubber based on a styrene-butadiene-styrene block copolymer (Cariflex ® TR-4113 of Shell) and 50 parts by weight of a precipitated silica with a specific surface area (DIN 66132) of 175 m$^2$/g and an average primary particle size of 18 micrometer (Ultrasil ® VN 3 of Degussa AG), various organosilicon compounds are incorporated in the indicated amounts:

(a) 7.5 parts by weight bis-(3-triethoxysilylpropyl)tetrasulfane
(b) 6.6 parts by weight bis-(3-triethoxysilylpropyl)disulfane
(c) 6.2 parts by weight 3-thiocyanatopropyltrimethoxylsilane
(d) 7.8 parts by weight vinyl-tris-(2-methoxyethoxy)-silane
(e) 6.7 parts by weight 3-chloropropyltriethoxysilane
(f) 5.5 parts by weight 3-mercaptopropyltrimethoxysilane
(g) 7.5 parts by weight phenylethyldiethoxysilane
(h) 7.5 parts by weight silanized polybutadiene oil (cf. Instruction Sheet Polyvest 3324 "Polymer Si-filler activator for rubber mixtures", Polyvest 25 of Chem. Werke Huels at Marl, Germany
(i) 6.9 parts by weight 3-azidopropyltriethoxysilane
(j) 7.35 parts by weight thiocyanatopropyltriethoxysilane Using an extruder, molded articles measuring 0.3×1.7 cm in dimensional length were produced from the particular mixture concerned in the form of rectangular profiles.

In like manner, comparable profiles were made from the base mixture containing the filler and no organosilane (V2). This fabrication method could not be applied to the base mixture without the filler (V1). Here, in order to obtain smooth surfaces, the thermoplastic rubber had to be shaped in a press into a plate having 2 parallel faces, using a metal mold.

The following properties were checked or measured on the test samples (molded articles).

1. The tensile strength (TS) in MPa as determined in accordance with DIN 53504.
2. The tensile modulus at 300% expansion (modulus, shortened to "M 300") in accordance with DIN 53504.
3. The Shore-A-hardness (SH) in accordance with DIN 53505.
4. The swelling of the molded articles (S), i.e., the volume increase in per cent by volume after a 28-day storage in distilled water.

The particular mixtures concerned were then subjected to the rheometer test (test sample preheated for 30 minutes at 155° C.) in accordance with DIN Preliminary Standard DIN 53529 on October 1972 and the minimal torques ($D_{min}$) were determined in nm, then the Mooney plasticity or viscosity (ML4) (test samples preheated for 30 minutes at 150° C.) in Mooney units was determined in accordance with DIN 53523 and 53524, i.e., at 150° C. with the standard rotor (L) and a 4-minute testing time. The measured values were as follows:

TABLE I

|  | Reference Mixtures | | Test sample | | | | | | | | | |
|---|---|---|---|---|---|---|---|---|---|---|---|---|
|  | V1 | V2 | (a) | (b) | (c) | (d) | (e) | (f) | (g) | (h) | (i) | (j) |
| 1. Tensile strength MPa | 7.5 | 11.0 | 7.9 | 8.1 | 8.5 | 8.4 | 7.5 | 9.2 | 8.0 | 8.2 | 8.6 | 8.3 |
| 2. Modulus 300 | 1.4 | 3.8 | 3.1 | 3.2 | 2.9 | 3.7 | 3.4 | 4.1 | 3.7 | 3.3 | 5.8 | 4.0 |
| 3. Shore-A-hardness | 43 | 76 | 72 | 71 | 67 | 66 | 75 | 72 | 72 | 75 | 68 | 72 |
| 4. Swelling Vol % | 1.71 | 6.72 | 1.52 | 1.47 | 2.53 | 1.74 | 1.80 | 1.40 | 1.44 | 2.69 | 2.10 | 2.47 |
| 5. Rheometer $D_{min}$ nm | 0.29 | 1.76 | 0.86 | 0.85 | 0.80 | 0.71 | 0.79 | 0.93 | 0.75 | 1.25 | 1.48 | 0.77 |
| 6. Mooney ML4 | 12 | 101 | 38 | 40 | 48 | 45 | 44 | 86 | 42 | 60 |  | 51 |

V1: without silica
V2: with silica

As will be apparent from Table I, the addition of silica to thermoplastic rubber results in a distinct increase in the measured values for the modulus 300, the Shore-A-hardness and the tensile strength (test samples V1 and V2) and, thereby, for the functional value of articles made in this fashion.

At the same time, however, it has been found that the measured values for the swelling, the rheometer $D_{min}$ and the Mooney viscosity ML₄4 increase for the silica containing test sample V2. This must be considered a disadvantage.

However, the measured values as determined for silane containing test samples show how the improvement, e.g., of the Shore-A-hardness and the modulus 300, achieved by the addition of silica can offset the concomitant significant deterioration of, e.g., the swelling value resulting from the addition of organosilanes to the mixture.

Examples of Group B

Into a base mixture consisting of 50 parts by weight of two thermoplastic rubbers based on styrene-butadiene-styrene copolymers, Cariflex ® TR-4130 (Shell) and Solpren ® 475 (Phillips Petroleum), 10 parts by weight polystyrene, 15 parts by weight processing oil (Cattinex 945), 0.3 parts by weight di-laurylthiodipropionate (DLTDP) as antioxidant as well as 0.3 parts by weight of an ultraviolet stabilizer (Tinuvin 326) are incorporated an organosilane in the amount of 0.1 to 15 parts by weight based on 100 parts by weight of the thermoplastic rubber. Bis-(triethoxysilylpropyl)-tetra-sulfane is used as the organosilane.

The mixtures contain as the filler 50 parts by weight of the precipitated silica previously mentioned in the examples of Group A.

The comparison mixture contains no organosilane. Apart from the test methods described hereinabove, the test samples prepared in accordance with the above described procedures are also checked for percentage elongation which is indicated in % (DIN 53504, item 2.3).

TABLE II

| Organosilane content | 0 | 0.1 | 0.94 | 1.87 | 3.75 | 7.5 | 15 |
|---|---|---|---|---|---|---|---|
| Percentage elongation % | 650 | 730 | 660 | 710 | 750 | 750 | 780 |
| Shore hardness | 63 | 67 | 69 | 67 | 68 | 66 | 64 |
| Swelling Vol % | 7.14 | 6.82 | 5.77 | 4.45 | 3.45 | 2.05 | 1.32 |
| Rheometer $D_{min}$ nm | 0.73 |  |  |  | 0.56 | 0.59 | 0.41 |
| Mooney ML4 | 49 |  |  | 42 | 32 | 23 | 18 |

It is shown that the test samples containing organosilanes have distinctly higher percentage elongations and that the Shore A hardness increases in the desired manner.

With as little as 0.1 parts by weight organosilane content, a distinct reduction of the water absorption of the test sample is found in comparison with the reference sample.

Therefore, the use of organosilanes as taught by the invention contributes toward reducing or overcoming the impediments accompanying the incorporation of fillers in thermoplastic rubbers, such as, for example, increased water adsorption and, from the application point of view, even leads to an improvement of properties in the end products made from the thermoplastic rubbers.

We claim:

1. Elastic molding material comprising at least one thermoplastic rubber and at least one silicate filler in an amount of 1–300 parts by weight, a processing or plasticizing oil in an amount of 0–100 parts by weight, and a sufficient amount of at least one stabilizer, which imparts resistance to aging, fatigue, oxidation, ozone or light, said molding material containing at least one organosilicon compound, having at least one alkoxysilyl group, in an amount of 0.1–25 parts by weight, all said parts by weight being based on 100 parts by weight of thermoplastic rubber.

2. The elastic molding material of claim 1 further comprising a thermoplastic synthetic material.

3. The elastic molding material of claim 1 further comprising a synthetic resin.

4. The elastic molding material of claim 2 further comprising a synthetic resin.

5. The elastic molding material of claim 1 further comprising said organosilicon compound being present as a premixed composition with the silicate filler.

6. The elastic molding material of claim 1 further comprising said organosilicon compound being present in a finely divided condition chemically united with the silicate filler.

7. The elastic molding material as set forth in claim 1 further comprising that the organosilicon compound has present at least one organosilane with the formulae:

$$X_p-C_mH_{2m+1-p}-SiR_n^1(OR)_{3-n}, \qquad I$$

wherein X represents chlorine or bromine, p is 1 or 2; m is 1 to 5, $R^1$ is $C_1$- to $C_5$-alkyl, $C_5$- to $C_6$-cycloalkyl or phenyl, R is $C_1$- to $C_5$-alkyl, $C_5$- to $C_6$-cycloalkyl, methoxyethyl, ethoxyethyl, phenyl or benzyl and n is 0; 1 or 2, including a hydrolyzate and/or a condensate, $$[R_n^1(RO)_{3-n}Si-(Alk)_q(Ar)_r-_2S_x] \text{ or} \qquad II$$

$$R_n^1(RO)_{3-n}Si-Alk-SH, \qquad III$$

wherein Ar is aryl with 6 to 12 atoms, r=0 or 1, $R^1$ is $C_1$- to $C_5$-alkyl, phenyl, R is $C_1$- to $C_5$-alkyl, methoxyethyl, ethoxyethyl, phenyl or benzyl, n is 0, 1 or 2, Alk is a bivalent, straight or branched carbohydrate with 1 to 6 carbon atoms, and x is an integer from 2.0 to 8.0, including their hydrolyzates and/or condensates, q=0 or 1, and contains as a silicate filler at least one filler obtained by precipitation from an aqueous medium and essentially composed of silica with specific surfaces measured according to DIN 66132 of between 30 and 250 m²/g, or contains a mixture of or a chemical reaction product with at least one of said silica fillers or carbon black.

8. The elastic molding material as set forth in claim 1, further comprising as the organosilane compound at least one organosilane with the formula:

$$A-SiR_n^1(OR)_{3-n}, \qquad IV$$

wherein $R^1$ is $C_1$- to $C_5$-alkyl, R is $C_1$- to $C_5$-alkyl, methoxyethyl, ethoxyethyl, phenyl, or benzyl, n is 0; 1 or 2, A is azido, thiocyanato, amino- or epoxyalkyl, in which the alkyl residue is a straight or branched carbohydrate with 1 to 6 carbon atoms, or contains aralkyl.

9. An article of manufacture made of the elastic molding material as set forth in claim 1.

* * * * *